US006421310B1

United States Patent
Sujino

(10) Patent No.: US 6,421,310 B1
(45) Date of Patent: Jul. 16, 2002

(54) DOOR OPEN-CLOSE DEVICE HAVING TRANSLATING PIVOT

(75) Inventor: Norihisa Sujino, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/543,585

(22) Filed: Apr. 5, 2000

(30) Foreign Application Priority Data

Apr. 8, 1999 (JP) .......................................... 11-100924

(51) Int. Cl.$^7$ .............................................. G11B 33/02
(52) U.S. Cl. .................... 369/75.1; 360/99.02; 369/77.2
(58) Field of Search .............................. 369/77.2, 75.1, 369/75.2; 360/92, 96.5, 99.02, 99.01, 99.06; 312/9.1–9.25

(56) References Cited

U.S. PATENT DOCUMENTS 644,434 A * 2/1900 Macey
726,957 A * 5/1903 Macey
1,288,665 A * 12/1918 Page
3,794,401 A * 2/1974 Dean et al. .................. 312/323
5,682,710 A * 11/1997 Davies et al. .................. 49/162
5,870,368 A * 2/1999 Nakamichi .................. 369/77.1

\* cited by examiner

Primary Examiner—Brian E. Miller
(74) Attorney, Agent, or Firm—Sughrue Mion, PLLC

(57) ABSTRACT

The device has a door for opening and closing an insertion opening defined in an apparatus casing to receive an object. The door is pivotally supported by the apparatus casing. The device includes a gear coaxial with a pivot of the door and unitarily defined with the door. The gear engages with a rack arranged in a support portion of the pivot. The pivot travels during the opening or closing motion of the door parallel to the object. inserting or ejecting direction. The pivot travels opposite to the door moving side when the door opens or closes. This allows a smaller door receiving space required for opening the door.

24 Claims, 4 Drawing Sheets

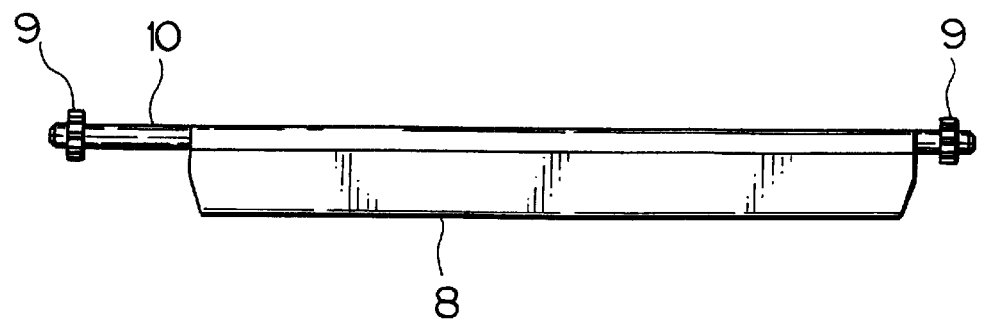
F I G. 2
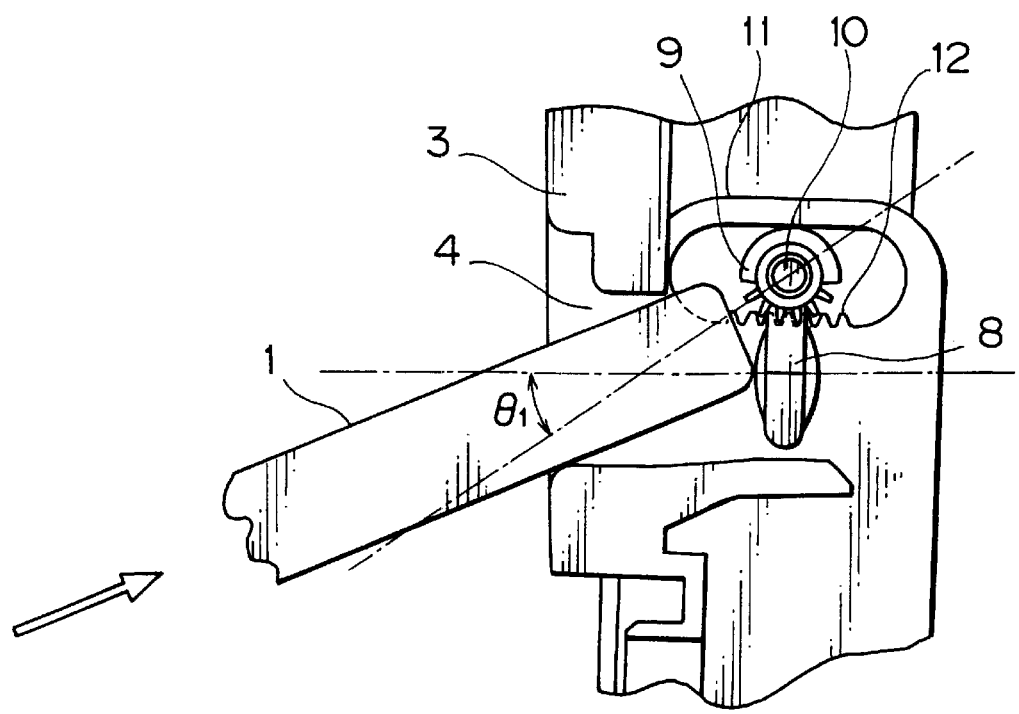
F I G. 3

DOOR OPEN-CLOSE DEVICE HAVING TRANSLATING PIVOT

BACKGROUND OF THE INVENTION

1. Field of the Invention

The present invention relates to a door open-close device disposed at an insertion opening of an apparatus for inserting an object such as a record medium.

2. Prior Art

Generally, a record medium reproduction apparatus has an insertion opening for receiving or removing such record medium. The insertion opening has a door closing for preventing dust and contaminants from entering the apparatus which is not in use.

First, a door open-close device will be discussed with describing a double hinged door which opens in the inserting and ejecting directions of an object received in an apparatus casing. Referring to FIG. 4A, the constitution of the door open-close device will be explained. The device has a door 5 mounted on an insertion opening 4 defined in a front panel 3 of the apparatus casing. The door 5 has a pivot shaft 7 received in a bearing portion 6 to turnably support the shaft 7. The door 5 having the turning shaft 7 can open in the inserting and ejecting directions of the object.

Next, referring to FIG. 5, the door 5 for opening and closing the insertion opening 4 will be discussed in detail. The door 5 is generally rectangular and has a size enough for entirely closing the insertion opening 4. The shaft 7 is extending externally from each lateral upper side of the door 5 for pivoting the door 5 to open the insertion opening 4. In addition, the door 5 is biased by a resilient mean like spring (not shown) at the closed position.

The above-described constitution causes the door 5 to normally close the opening 4, preventing dust or the like from entering a casing 2 of the apparatus. Meanwhile, the door 5 turns to open the opening 4 with insertion or ejection of a record medium 1.

Next, referring to FIG. 4B, the opening operation of the door 5 with insertion or ejection of the record medium 1 will be discussed. The insertion of the record medium 1 forces the door 5 to initially turn around the shaft 7 to open the door 5. A further insertion of the record medium 1 makes the door 5 continue turning in the insertion side until the door turns by about 90° to completely open the opening 4. Thereby, the record medium 1 can pass through the opening 4 to move into the apparatus casing 2. In this state, the completely opened door 5 is extending by the width L of the door 5 in the medium insertion direction, since the door 5 turns around the shaft 7.

Next, referring to FIG. 4C, the opening operation of the door 5 with ejecting of the record medium 1 will be discussed. The door 5 operates basically in the same way as when the record medium 1 is inserted. However, the door 5 turns opposite to the direction of the insertion time since the door is opened by the record medium 1 moving in the ejecting direction. Thus, the completely opened door is extending by the width L of the door 5 in the ejecting direction from the shaft 7.

Such double hinged constitution allows the door 5 to open by utilizing the force due to the movement of the record medium during the insertion or ejection thereof. This requires no additional power device, providing a door open and close simplified structure and reducing an electrical power consumption.

Nevertheless, the above-described door device requires a door receiving space extending at least twice of the width L of the door 5, since the double hinged door 5 must extend by the width L both in the inserting direction and in the ejection direction from the shaft 7. Thus, the front panel 3 having the door 5 requires such lengthened receiving space, increasing the dimension of the casing in the insertion direction. This dimension increase is disadvantageous for an apparatus that is required to have a smaller depth so that the apparatus may be easily installed in a limited space.

Furthermore, the door 5 must be positioned in the opening 4 with a distance from the front panel 3, since there is the door receiving space required for opening the door 5 with the insertion and ejection of the record medium. Thereby, as illustrated in FIG. 6, the record medium 1 may disadvantageously abut against the shaft 7 so that the door is not smoothly opened, when the record medium is inserted in a diagonal direction.

SUMMARY OF THE INVENTION

To solve the problem, the present invention provides a door open-close device for opening and closing an insertion opening defined in an apparatus casing to receive an object. The door is pivotally supported by the apparatus casing and the device has a door pivot that travels during the opening or closing motion of the door.

Such constitution decreases the extended distance of the door when the door is opened by traveling the pivot shaft opposite to the door opening side with the door opening operation.

BRIEF DESCRIPTION OF THE DRAWINGS

FIG. 2 is a front view showing a door of the double hinged door open-close device according to the present invention;

FIG. 3 is an illustration showing a state in which a record medium is diagonally inserted into an apparatus casing provided with the double hinged door open-close device according to the present invention;

DETAILED DESCRIPTION OF THE PREFERRED EMBODIMENT

Figure 1A:
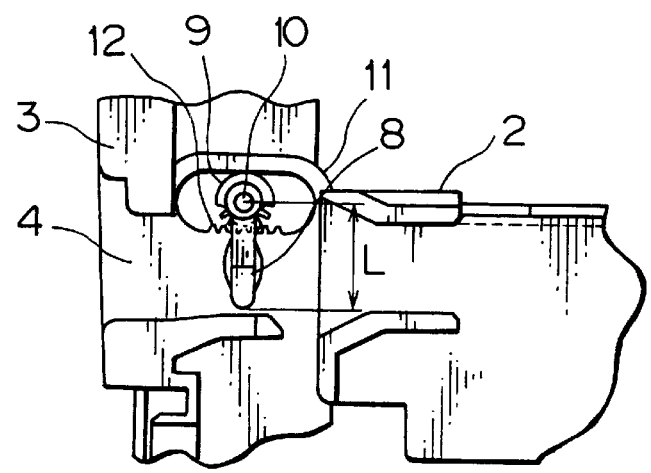
FIGS. 1A to 1C are illustrations showing constitutions of a double hinged door open-close device according to the present invention to sequentially show a door closed state, an object insertion time, and the object ejecting time.

Next, a door open-close device according to the present invention will be discussed. Referring to FIG. 1A, the constitution of the device is explained, in which a component having the same structure as one described in the prior art has the same reference numeral of the prior art component. Around an insertion opening 4, there is disposed a bearing portion 11 for turnably supporting a gear 9 mounted on a door 8. The bearing portion 11 includes an elongated space extending parallel to the insertion and ejecting directions of a record medium. The elongated space 11 is provided with a rack 12 engaging with the gear 9 at an inside peripheral surface of the space 11. The other constitutions of the door open-close device are the same as those of the prior art.

Next, referring to FIG. 2, the door 8 constituting the door open-close device according to the present invention will be discussed in detail. The door 8 is different from the door 5 described in the prior art in that the door 8 has the gear 9 coaxially fitted on an end of a door shaft 10. The other construction of the door 8 is the same as the door to 5 of the prior art.

That is, the door open-close device according to the present invention is different from the prior-art device in that the engagement of the gear 9 joined to the shaft 10 with the rack 12 disposed in the bearing portion 11 turnably supports the door 8.

Figure 1B:
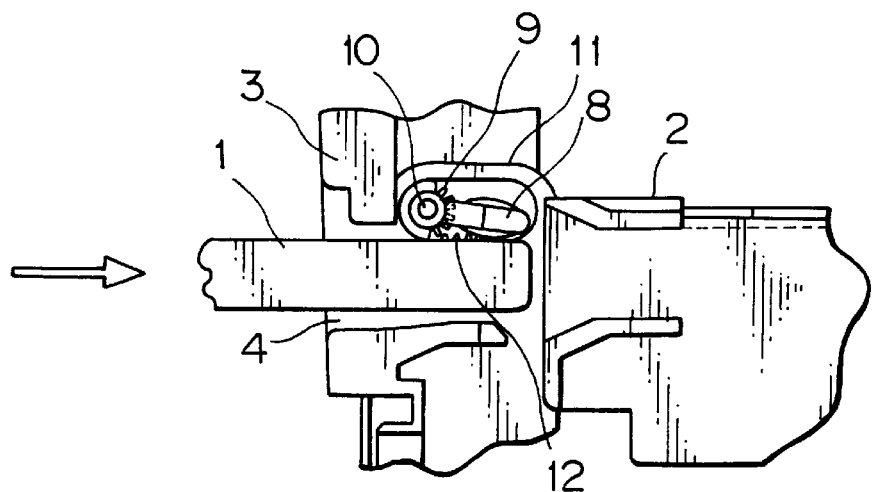

Next, the opening operation of the door 8 for inserting and ejecting the record medium 1 will be discussed. Referring to FIG. 1B, the operation of the door 8 with insertion of the record medium will be explained. The record medium 1, when inserted, abuts against the door 8 to force it to turn around the shaft 10. At the same time, the gear 9 joined to the shaft 10 turns by the turn of the door 8. The gear 9 engaged with the rack 12 disposed in the bearing portion 11 begins to travel opposite to the medium insertion direction. A further advancement of the record medium 1 causes the door 8 to continue turning toward the insertion side until the door 8 turns by about 9° to completely open the insertion opening 4. Meanwhile, the gear 9 also continues to travel on the rack 12 until the door 8 opens completely, and the gear 9 reaches a travel end apart from the origin point corresponding to the closed state of the door 8.

The operation described above completely opens the insertion opening 4 so that the record medium 1 can advance into the casing 2 through the opening 4. In this state, the door 8 is extending by the distance L of the door width in the insertion direction, since the door 8 turns around the shaft 10 like the prior art. However, the door 8 transfers in the medium ejecting direction, since the gear 9 unitarily joined to the door 8 travels in the medium ejecting direction with turning of the gear 9. Thus, the door open-close device according to the present invention provides a reduced extension distance of the door 8 when the door 8 opens. The reduced amount is equal to the travel distance of the gear 9. The complete advance of the record medium 1 into the casing 2 releases the door 8 from the record medium 1 to close again the door 8 as illustrated in FIG. 1A.

Figure 1C:
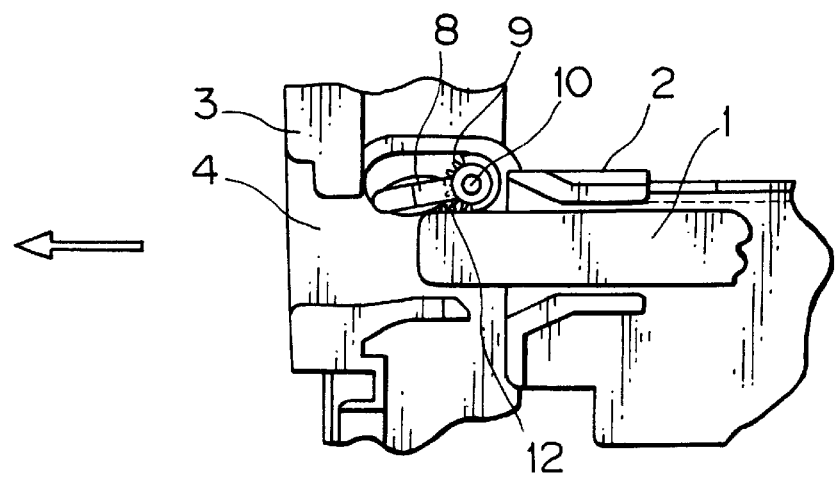
Figure 4A:
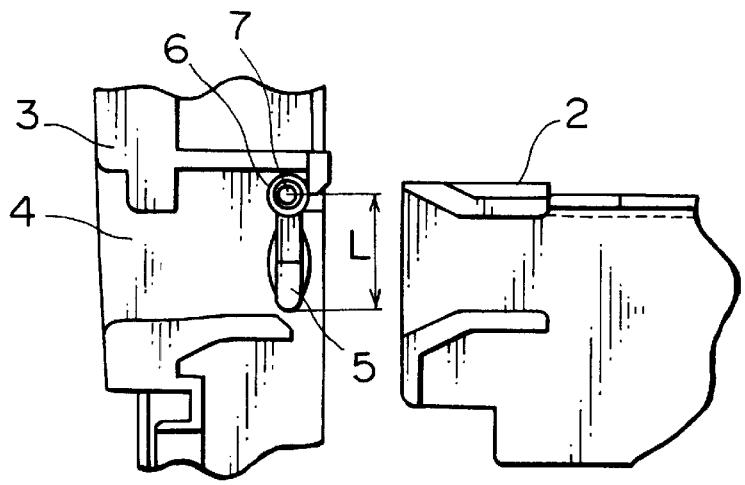
FIGS. 4A to 4C are illustrations showing constitutions of a conventional double hinged door open-close device to sequentially show a door closed state, an object insertion time, and the object ejecting time.
Figure 4B:
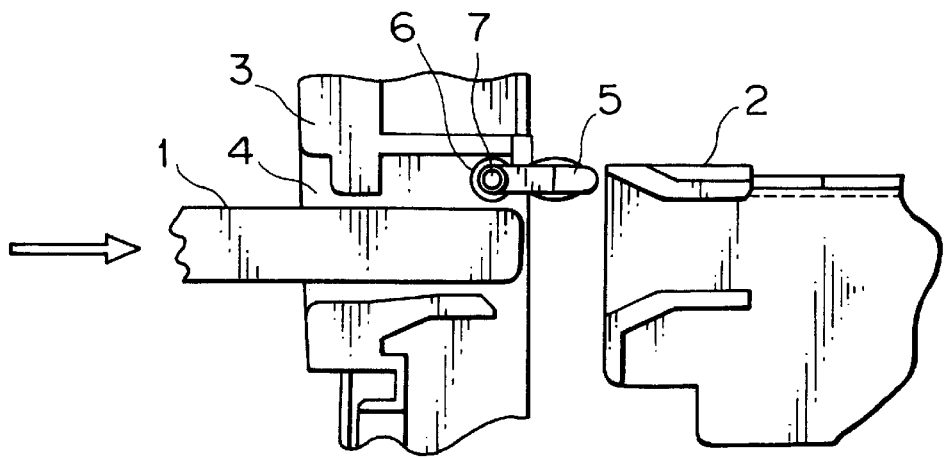
Figure 4C:
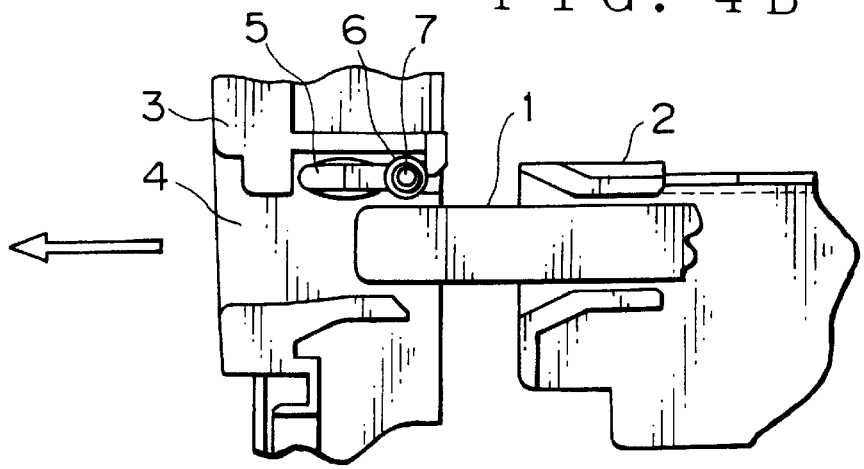
Figure 5:
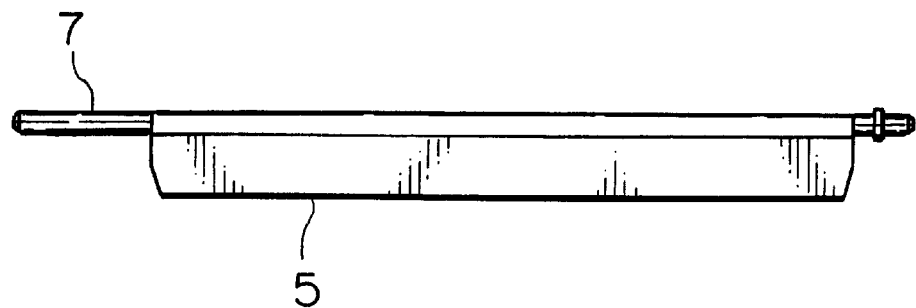
FIG. 5 is a front view showing a door of the conventional double hinged door open-close device.

Referring to FIG. 1C, the opening operation of the door 8 with ejecting of the record medium 1 will be discussed. The door opening operation is basically the same as that in the insertion of the record medium 1. However, the door 8 turns opposite to the direction of the insertion time, since the door 8 is turned by the record medium which is drawn out. The door 8 is extending by the distance L of the door width from the shaft 10 in the ejecting direction when the door opens completely. However, the travel of the gear 9 in the insertion direction reduces the extension distance of the door 8.

In the above discussion of the opening operation of the door open-close device according to the present invention, when the record medium 1 is inserted, the door 8 turns toward the insertion side and the gear 9 travels toward the ejecting side. With ejecting of the record medium 1, the door 8 turns in the ejecting side and the gear 9 travels in the insertion side. That is, when opened, the door 8 moves in the opening direction and at the same time travels in the opposite direction of the opening direction. Thus, in the double hinged door open-close device according to the present invention, the gear 9 and the rack 12 can be arranged such that a door receiving space required in the inserting state is utilized also for receiving the door 8 in the ejecting state. This is important for minimizing the door open-close device. Therefore, the positioning relationship between the gear 9 and the rack 12 will be discussed hereinafter in detail with referring to the door open-close device having the double hinged structure.

As illustrated in FIG. 1A, when the door is closed, the gear 9 is positioned at the middle point of the overall length of the rack 12 extending both in the insertion side and in the ejecting side. The travel distance of the gear 9 during the insertion of the medium 1 is equal to that of the ejecting time and is designed to be a half of the width L of the door 8. Thus, in the insertion and ejecting of the medium, the S overall length of the rack 12 is the sum of the travel distances of gear 9 to become equal to the width L of the door 8.

Accordingly, for example, as illustrated in FIG. 1A and FIG. 1B, the gear 9 engages with the left-hand half of the rack 12 when the door 8 opens in the insertion side. An upper half (above a chain line) of the door 8 is received in the left-hand half of the rack 12. A lower half (below the chain line) of the door 8 is received in the right-hand half of the rack 12. That is, the door 8 is received in a receiving space approximately equal to the length of the rack 12 when the door 8 is opened toward either side. The prior art requires a door receiving space having a length generally twice of the width of the door 5, while the door open-close device according to the present invention requires the door receiving space having a length generally equal to the width of door 8, reducing the device in depth. Hence, the front panel 3 having the door 8 can be reduced in depth, improving the apparatus in size reduction.

Figure 6:
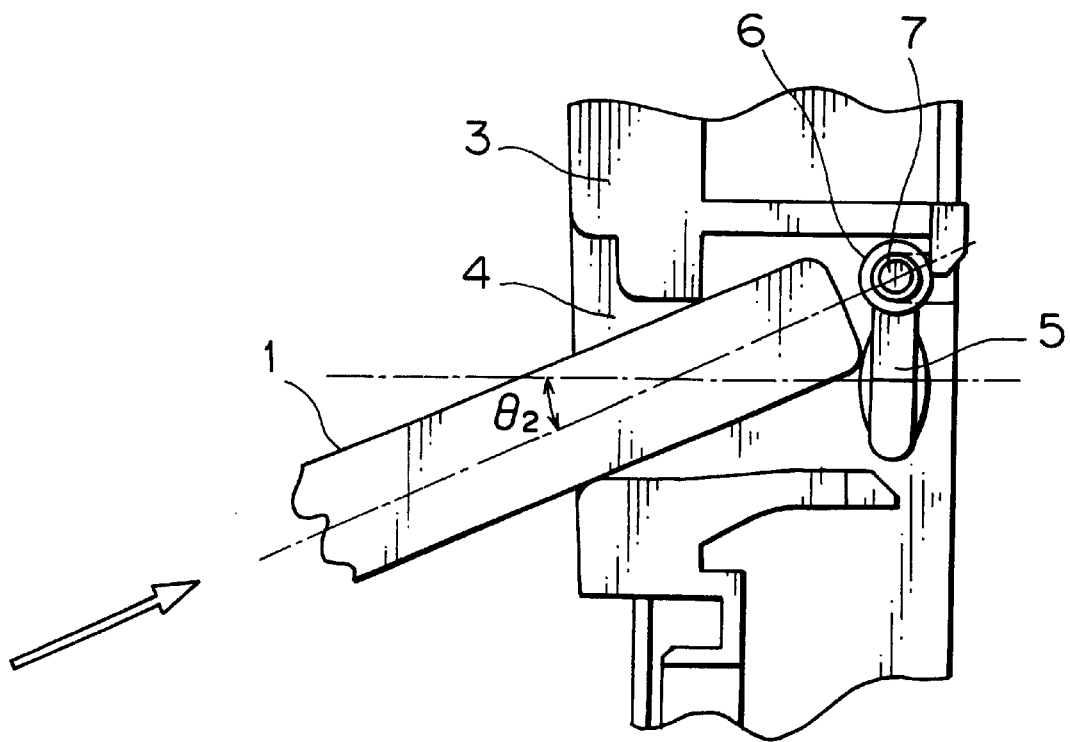
FIG. 6 is an illustration showing a state in which a record medium is diagonally inserted into an apparatus casing provided with the conventional double hinged door open close device.

In addition, the decreased door receiving space required for opening the door 8 enables the door 8 to be positioned less apart from the foremost face of the front panel 3. Thereby, as illustrated in FIG. 3, even when the record medium 1 is diagonally inserted into the casing 2, the diagonal angle (θ1) at which the record medium 1 abuts against the shaft 10 is larger than such diagonal angle (θ2) of the prior art illustrated in FIG. 6. This decreases the possibility of abutment of the record medium 1 against the shaft 10 when the record medium 1 is diagonally inserted as compared with the prior art.

The embodiment described above does not intend to limit the present invention. For example, although the present invention has been discussed with referring to the embodiment having a double hinged door structure, the present invention is also applied to a one-way opening door. In the case of the one-way opening door, a space required for opening the door can be desirably designed. In addition, the configurations of the rack and door described in the embodiment are typical ones and may be otherwise configured within the present invention. The gear mechanism applied in the embodiment for traveling the pivot may be replaced by another guide means like a rail.

As described above, the door open-close device according to the present invention provides a compact door open-close device having a smaller receiving space required for opening the door. Furthermore, the present invention includes a large part of the prior art in configuration to make use of the conventional door open-close device. In addition, the door can be positioned less apart from the foremost surface of the front panel, improving the apparatus including the door in appearance design.

What is claimed is:

1. An open-close device having a door for opening and closing an insertion opening defined in an apparatus casing to receive an object, wherein said door is pivotally supported by said apparatus casing at a pivot and said pivot travels during the opening or closing motion of said door, wherein said pivot is located at a first position with respect to said apparatus casing when said door is closed, wherein said pivot travels to a second position with respect to said apparatus casing when said door opens by pivoting in a first direction, wherein said pivot travels to a third position with respect to said apparatus casing when said door opens by pivoting in a second direction, wherein said first direction is opposite to said second direction, and wherein said first position is disposed between said second position and said third position.

2. The device set forth in claim 1, wherein said door pivots in said first direction when said object is inserted into said apparatus casing, and wherein said door pivots in said second direction when said object is removed from said apparatus casing.

3. The device as set forth in claim 2, wherein a direction from said first position to said third position is opposite to an insertion direction along which said object travels when said object is inserted into said apparatus casing.

4. The device as set forth in claim 2, wherein a direction from said first position to said third position is opposite to a removal direction along which said object travels when said object is removed from said apparatus casing.

5. The device as set forth in claim 4, wherein said insertion direction, said removal direction, said direction from said first position to said second position and said direction from said first position to said third position are substantially parallel to each other.

6. A door open-close device comprising:
an insertion opening to receive an object,
a turnable door shaft,
a door supported by said door shaft so as to be turnable around said door shaft to open and close said insertion opening, and
a bearing portion for supporting said door shaft, said bearing portion extended parallel to the insertion direction of the object,
wherein the insertion of the object pushes said door to open said door while a pivot for said door shaft travels along the bearing portion in a direction opposed to the insertion direction of the object.

7. An open-close device having a door for opening and closing an insertion opening defined in an apparatus casing to receive an object, wherein said door is pivotally supported by said apparatus casing,
said device comprising a gear and a rack, said gear being coaxial with a pivot of said door and unitarily defined with said door, said rack being engaged with said gear and arranged in a support portion of said apparatus casing for supporting said pivot, wherein the opening or closing motion of said door turns said gear so that said pivot travels along the rack, and when the door is closed, the gear is positioned at a middle point of the length of the rack.

8. The device set forth in claim 7, wherein, when an object is completely inserted into or ejected from the apparatus casing, the pivot is positioned at the middle point of the length of the rack and the door is closed.

9. The device set forth in claim 7, wherein the pivot travels in a direction parallel and opposite to an object insertion direction when the door opens when said object is inserted into the apparatus casing.

10. The device set forth in claim 7, wherein the pivot travels in a direction parallel and opposite to an object ejecting direction when the door opens when said object is ejected from the apparatus casing.

11. The device set forth in claim 7, wherein said object insertion direction is opposite to said object ejecting direction.

12. The device set forth in claim 7, the device further comprising a door receiving space defined in the apparatus casing for receiving the door when said door opens.

13. The device set forth in claim 11, wherein the door receiving space has a length substantially equal to the width of the door.

14. An open-close device having a door for opening and closing an insertion opening defined in an apparatus casing to receive an object, wherein said door is pivotally supported by said apparatus casing,
said device comprising a gear and a rack, said gear being coaxial with a pivot of said door and unitarily defined with said door, said rack being engaged with said gear and arranged in a support portion of said apparatus casing for supporting said pivot,
wherein the opening or closing motion of said door turns said gear so that said pivot travels along said rack,
wherein said door opens in object insertion and ejecting directions from a closed position of said door, said rack is extending parallel to the object insertion direction and to the object ejecting direction, and said gear is positioned at the middle point of the length of said rack required for the pivot to travel when said door is closed.

15. An open-close device, comprising:
a casing having a casing opening and a pivot support portion,
a door that has a pivot which is pivotally supported at said pivot support portion of said casing, wherein said door pivots around said pivot to open and close said casing opening,
wherein said pivot is located at a first position with respect to said pivot support portion when said door is closed,
wherein said pivot travels to a second position with respect to said pivot support portion when said door opens by pivoting in a first direction,
wherein said pivot travels to a third position with respect to said pivot support portion when said door opens by pivoting in a second direction,
wherein said first direction is opposite to said second direction, and
wherein said first position is disposed between said second position and said third position.

16. The device as claimed in claim 15, wherein said pivot support portion comprises a rack,
wherein said pivot comprises a gear which engages said rack and which rotates in conjunction with a pivoting of said pivot of said door.

17. The device as claimed in claim 16, wherein said first position, said second position, and said third position are disposed linearly on said rack.

18. The device as claimed in claim 15, wherein said door pivots in said first direction when an object is inserted into said casing via said casing opening, and
wherein said door pivots in said second direction when said object is removed from said casing via said casing opening.

19. The device as claimed in claim 18, wherein a direction from said first position to said second position is opposite to an insertion direction along which said object travels when said object is inserted into said apparatus casing.

20. The device as claimed in claim 19, wherein a direction from said first position to said third position is opposite to a removal direction along which said object travels when said object is removed from said apparatus casing.

21. The device as set forth in claim 20, wherein said insertion direction, said removal direction, said direction from said first position to said second position, and said direction from said first position to said third position are substantially parallel to each other.

22. A door open-close device comprising:

an insertion opening to receive an object, a turnable door shaft, a door supported by said door shaft so as to be turnable around said door shaft to open and close said insertion opening, a bearing portion for supporting said door shaft, a gear fitted to said door shaft so as to be coaxial with said door shaft, and a rack fitted to said bearing portion and engaged with said gear, wherein the opening or closing motion of said door turns said gear so that said door shaft can travel along said rack, and said gear is positioned at a middle point of a length of said rack required for opening and closing said door in a closed state of said door.

23. A door open-close device comprising:

an insertion opening to receive an object, a turnable door shaft, a door supported by said door shaft so as to be turnable around said door shaft to open and close said insertion opening, a bearing portion for supporting said door shaft, a gear fitted to said door shaft so as to be coaxial with said door shaft, and a rack fitted to said bearing portion and engaged with said gear, wherein the opening or closing motion of said door turns said gear so that said door shaft can travel along said rack, and said door shaft is positioned at a middle point of a length of said rack required for opening and closing said door in a closed state of said door.

24. The device set forth in claim 1 or 7, wherein said pivot travels in a direction parallel and opposite to an insertion direction of the object when the object is inserted into the apparatus casing.

* * * * *